T. BEALE.
Agricultural Fork.
No. 62,594. Patented Mar. 5, 1867.
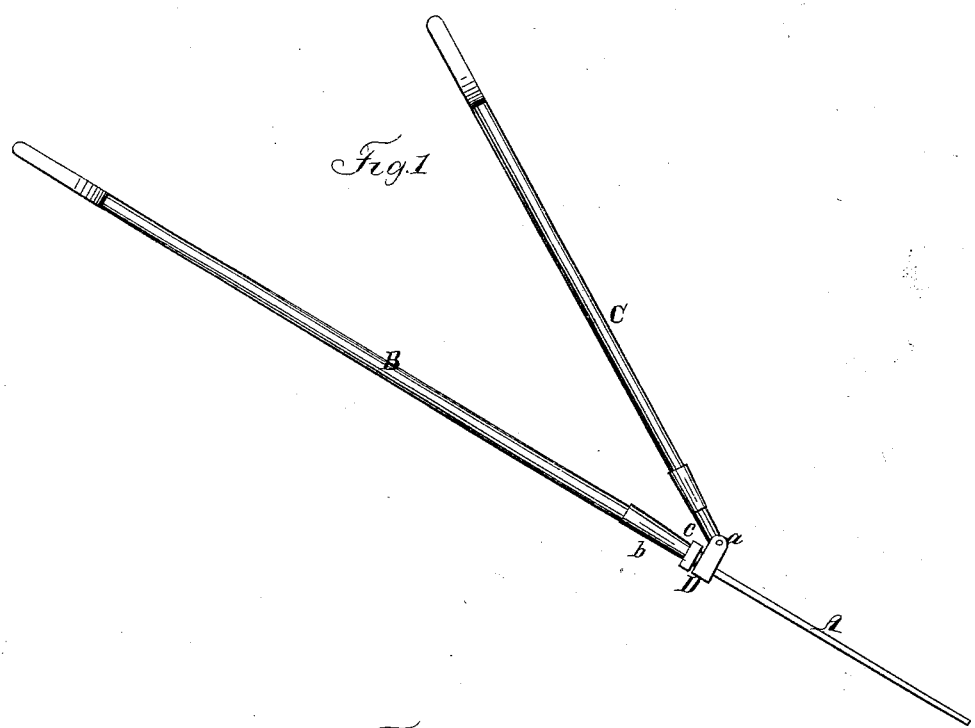
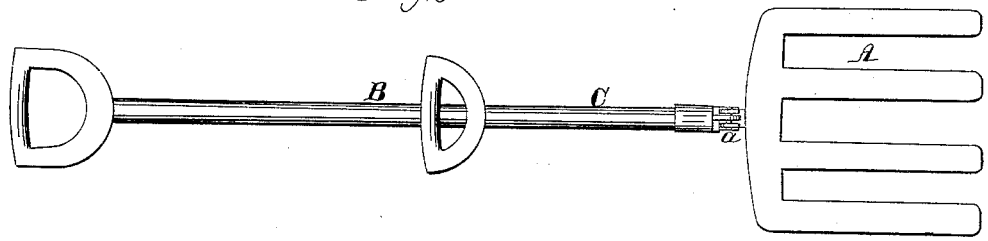

United States Patent Office.

THOMAS BEALE, OF NEW MILFORD, ILLINOIS.

Letters Patent No. 62,594, dated March 5, 1867.

IMPROVEMENT IN AGRICULTURAL FORKS.

*The Schedule referred to in these Letters Patent and making part of the same.*

TO ALL WHOM IT MAY CONCERN:

Be it known that I, THOMAS BEALE, of New Milford, in the county of Winnebago, and State of Illinois, have invented a new and improved Agricultural Fork; and I do hereby declare that the following is a full, clear, and exact description thereof, which will enable others skilled in the art to make and use the same, reference being had to the accompanying drawings, forming part of this specification, in which—

Figure 1 is a side view of my invention.

Figure 2, a front or face view of the same.

Similar letters of reference indicate like parts.

This invention relates to a new and improved fork for spading up the earth, digging esculent vegetables, roots, &c., and has for its object, ease of labor, and a greater facility in manipulating the implement. To this end the invention consists in applying a supplemental handle to the fork in the manner substantially as hereinafter fully shown and described.

A represents the fork, and B the handle of the same, the fork being permanently attached to the handle. C represents a supplemental handle, which is shorter than B, and is attached by a pivot, $a$, to a collar, D, the latter being fitted loosely on the ferrule $b$ of the handle B, and below a shoulder, $c$, thereon. By this mode of connecting the handle C to the handle B, a swivel joint is obtained which admits of the fork A being turned and the handles B C being spread or moved from each other and also towards each other, as may be necessary in manipulating the fork. The operator grasps the two handles B C at their ends, and the fork is chiefly worked by the hands and arms, the fork being easily raised by the handle C. This arrangement greatly relieves the back of the operator; he is not required to stoop so much as is necessary in using the ordinary fork, and his strength is applied to the implement in a much more favorable manner.

Having thus described my invention, I claim as new, and desire to secure by Letters Patent—

A fork for agricultural purposes provided with a supplemental handle, C, applied or attached to the main handle B by means of a swivel connection, substantially as shown and described.

The above specification of my invention signed by me this 14th day of April, 1866.

THOMAS BEALE.

Witnesses:
H. N. STARR,
S. RISING.